United States Patent
McKinney et al.

(10) Patent No.: US 10,829,033 B1
(45) Date of Patent: Nov. 10, 2020

(54) AUTOMATICALLY CONTROLLED HEADER WORK LIGHTS

(71) Applicant: CNH Industrial America LLC, New Holland, PA (US)

(72) Inventors: Preston L. McKinney, Rebersburg, PA (US); Nathaniel Smith, Lancaster, PA (US); Cory D. Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/545,621

(22) Filed: Aug. 20, 2019

(51) Int. Cl.
| | | |
|---|---|---|
| *B60Q 1/14* | (2006.01) | |
| *B60Q 1/08* | (2006.01) | |
| *B60Q 1/18* | (2006.01) | |
| *B60Q 3/18* | (2017.01) | |
| *B60Q 1/04* | (2006.01) | |

(52) U.S. Cl.
CPC .......... *B60Q 1/1423* (2013.01); *B60Q 1/045* (2013.01); *B60Q 1/085* (2013.01); *B60Q 1/18* (2013.01); *B60Q 3/18* (2017.02); *B60Q 2300/314* (2013.01)

(58) Field of Classification Search
CPC .......... B60Q 1/1423; B60Q 1/18; B60Q 3/18; B60Q 1/045; B60Q 1/085; B60Q 2300/314
See application file for complete search history.

(56) References Cited

U.S. PATENT DOCUMENTS

| | | | | |
|---|---|---|---|---|
| 4,009,555 | A | * 3/1977 | Temple | A01D 41/141 56/10.2 E |
| 4,502,270 | A | * 3/1985 | Shupert | A01D 45/021 56/119 |
| 5,161,874 | A | * 11/1992 | Benes | B60Q 1/32 362/552 |
| 5,246,285 | A | * 9/1993 | Redburn | F21S 9/02 312/223.5 |
| 8,868,304 | B2 | 10/2014 | Bonefas | |
| 9,403,474 | B2 | 8/2016 | Kaatrasalo et al. | |
| 10,023,106 | B2 | 7/2018 | Gresch | |
| 2010/0107584 | A1* | 5/2010 | Sheidler | A01D 41/12 56/10.2 R |
| 2011/0080748 | A1* | 4/2011 | Huang | F21V 3/00 362/386 |
| 2012/0206050 | A1* | 8/2012 | Spero | H05B 3/008 315/152 |

(Continued)

FOREIGN PATENT DOCUMENTS

| | | |
|---|---|---|
| EP | 2 158 799 B9 | 12/2012 |
| EP | 3 130 211 A1 | 2/2017 |

*Primary Examiner* — Donald L Raleigh
(74) *Attorney, Agent, or Firm* — Peter Zacharias; Patrick Sheldrake

(57) ABSTRACT

A header for an agricultural vehicle including a frame having lateral ends and an automatic lighting system having at least one light connected to the frame and at least one sensor connected to the frame and configured for sensing a level of light and providing a signal indicative of the level of light. The header also includes an electronic control unit operably connected to the at least one light and the at least one sensor. The electronic control unit being configured for automatically operating the at least one light upon receiving the signal of the at least one sensor.

17 Claims, 3 Drawing Sheets

(56) References Cited

U.S. PATENT DOCUMENTS

| | | |
|---|---|---|
| 2015/0124054 A1 | 5/2015 | Darr et al. |
| 2015/0195991 A1* | 7/2015 | Ricketts .............. A01D 41/141 56/249 |
| 2018/0236928 A1 | 8/2018 | Fritz et al. |
| 2020/0031270 A1* | 1/2020 | Beschorn .............. A01D 75/00 |

* cited by examiner

AUTOMATICALLY CONTROLLED HEADER WORK LIGHTS

BACKGROUND OF THE INVENTION

The present invention pertains to agricultural vehicles and, more specifically, to work lights on a header for an agricultural vehicle.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a corn header which includes an auger and row units with snouts, gathering chains, and stalk rolls in order to harvest corn.

Some headers may additionally include a lighting system for lighting portions of the header during operation thereof in low-light conditions. For example, the header may include one or more lights that light up the conveyor of the header, thereby illuminating the flow of crop material. Generally, an operator must manually turn on and off the lights from within the cab of the combine. As can be appreciated, manually operating the lighting system may undesirably increase the number of controls the operator must manage. Additionally, the requisite wiring and switches in the cab for operating the lighting system may increase the cost of the agricultural vehicle.

What is needed in the art is a cost-effective and automatic lighting system for a header.

SUMMARY OF THE INVENTION

In one exemplary embodiment formed in accordance with the present invention, there is provided a header with a frame, an automatic lighting system with at least one light and at least one ambient light sensor, and an electronic control unit. The ambient light sensor senses the level of light and communicates a signal to the electronic control unit which is indicative of the level of light. Thereby, the electronic control unit automatically activates or deactivates the lights of the header responsive to the ambient light at a location on or around the header.

In another exemplary embodiment formed in accordance with the present invention, there is provided a header for an agricultural vehicle including a frame having lateral ends and an automatic lighting system having at least one light connected to the frame and at least one sensor connected to the frame and configured for sensing a level of light and providing a signal indicative of the level of light. The header also includes an electronic control unit operably connected to the at least one light and the at least one sensor. The electronic control unit being configured for automatically operating the at least one light upon receiving the signal of the at least one sensor.

In yet another exemplary embodiment formed in accordance with the present invention, there is provided an agricultural vehicle that includes a chassis, a feeder housing connected to the chassis, and a header connected to the feeder housing. The header includes a frame having lateral ends and an automatic lighting system having at least one light connected to the frame and at least one sensor connected to the frame and configured for sensing a level of light and providing a signal indicative of the level of light. The agricultural vehicle also includes an electronic control unit operably connected to the at least one light and the at least one sensor. The electronic control unit being configured for automatically operating the at least one light upon receiving the signal of the at least one sensor.

In yet another exemplary embodiment formed in accordance with the present invention, there is provided a method for operating an agricultural vehicle. The method includes an initial step of providing a header for the agricultural vehicle. The header includes a frame having lateral ends and an automatic lighting system having at least one light connected to the frame and at least one sensor connected to the frame and configured for sensing a level of light and providing a signal indicative of the level of light. The header also includes an electronic control unit operably connected to the at least one light and the at least one sensor. The method includes the steps of sensing the level of light by the at least one sensor and activating the at least one light automatically, by the electronic control unit, upon the at least one sensor sensing that the level of light is below a preset threshold of light. The method includes a further step of deactivating the at least one light automatically, by the electronic control unit, upon the at least one sensor sensing that the level of light is above the preset threshold of light.

One possible advantage of the exemplary embodiment of the agricultural header is that oversight by the operator can be reduced because the lighting system of the header is automatically controlled.

Another possible advantage of the exemplary embodiment of the agricultural header is that cost may be reduced because the automatic control of the lighting system eliminates the standard wiring and in-cab switches needed to manually operate the lighting system.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but they should not be construed as limiting. The terms "longitudinal" and "transverse" are determined with reference to the fore-and-aft direction of the agricultural harvester and are equally not to be construed as limiting.

Figure 1:
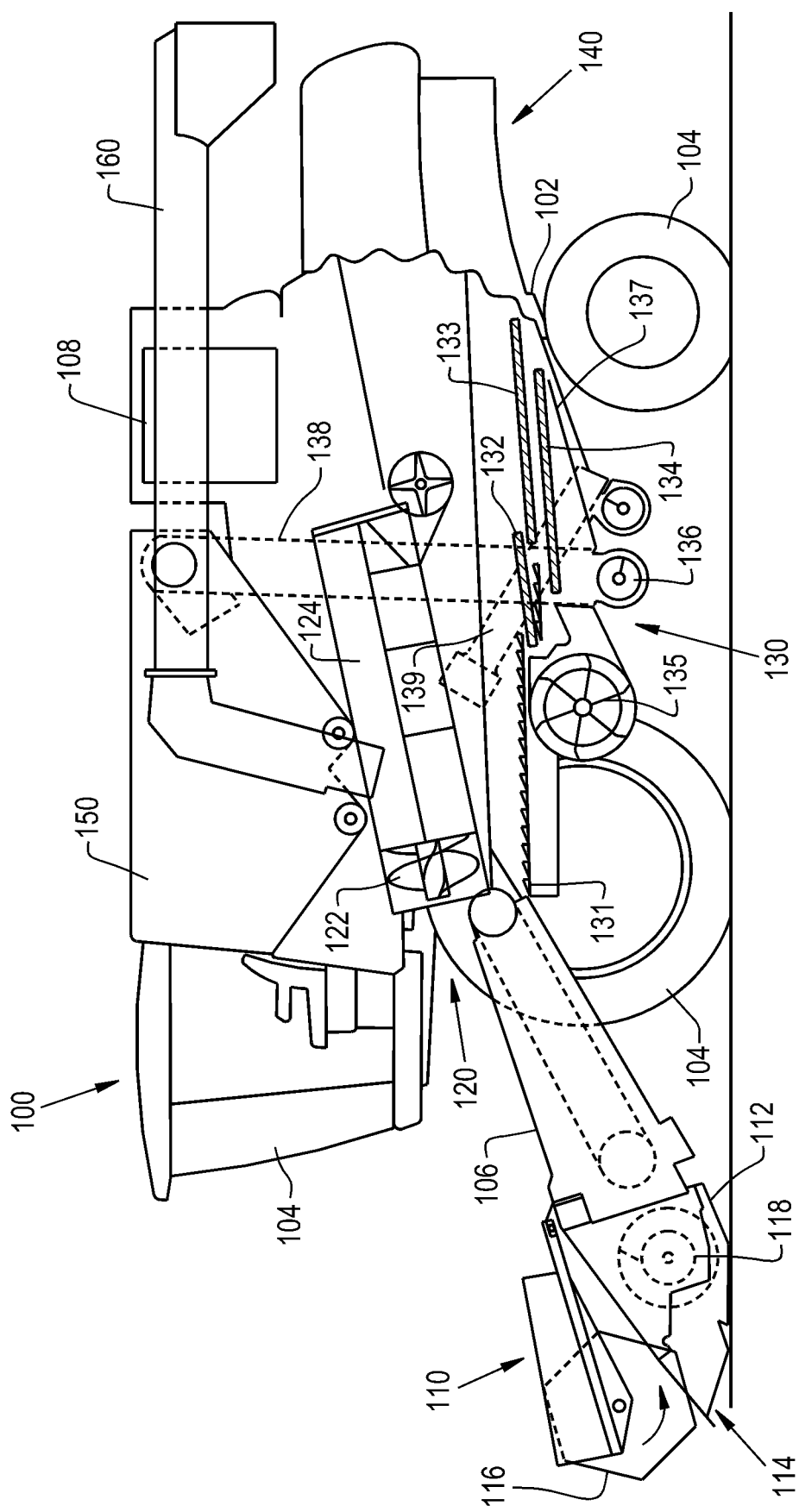
FIG. 1 illustrates a perspective view of an exemplary embodiment of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine 100. However, the agricultural vehicle 100 may be in the form of any desired agricultural vehicle 100, such as a windrower. The agricultural vehicle 100 generally includes a chassis 102, ground engaging wheels and/or tracks 104, a feeder housing 106, and a prime mover 108. The combine 100 may also include a header 110, a separating system 120, a cleaning system 130, a discharge system 140, an onboard grain tank 150, and an unloading auger 160.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and a conveyor 118, e.g. an auger 118 with flighting, that feeds the severed crop inwardly from each lateral end of the frame 112 toward feeder housing 106. The header 110 may be in the form of any desired header, such as a draper header or a corn header. As can be appreciated, the header 110 may be at least partially lifted or carried by the feeder housing 106, which typically includes an actuating system with one or more hydraulic cylinders.

Figure 2:
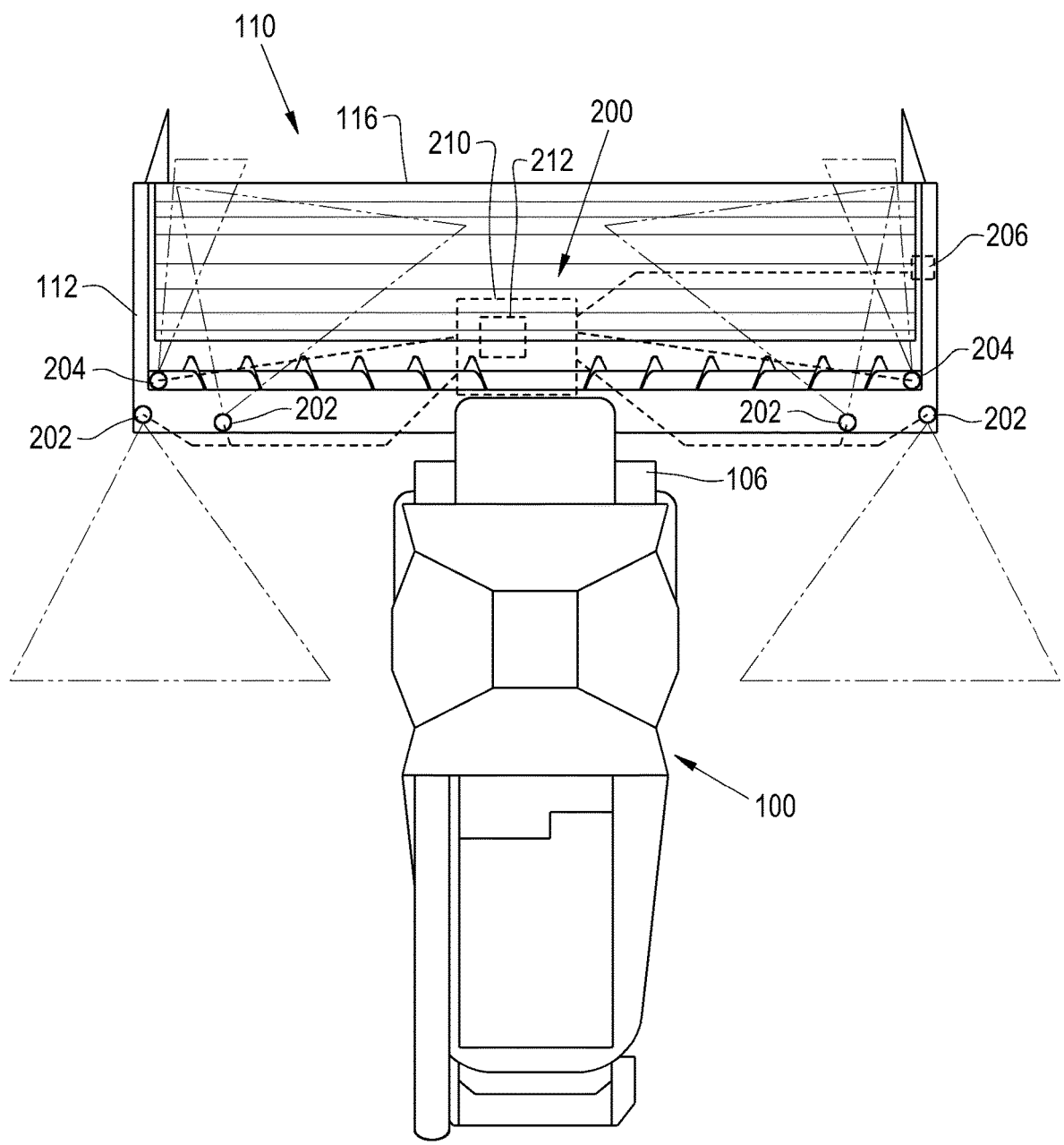
FIG. 2 illustrates the automatic lighting system for the header of FIG. 1.

Referring now collectively to FIGS. 1-2, there is shown an exemplary embodiment of an automatic lighting system 200 for the header 110. The automatic lighting system 200 generally includes at least one light 202, at least one sensor 204 for sensing a level of light surrounding the header 110, and an electronic control unit (ECU) 210, e.g. a controller 210 with a memory 212. The controller 210 automatically operates the light(s) 202 upon communicating with the sensor(s) 204.

The light(s) 202 may be connected to the frame 112 of the header 110 at any desired location. As shown, the automatic lighting system 200 includes four lights 202 with two lights 202 being attached to the lateral ends of the frame 112, for illuminating an area behind the frame 112, and two lights 202 being attached inwardly from the lateral ends of the frame 112, for illuminating the frame 112 where crop enters and flows through the header 110. However, it should be appreciated that the automatic lighting system 200 may include any number of lights 202 for illuminating any desired area located on or around the header 110. Each light 202 may be in the form of any desired light, such as an incandescent light bulb or light emitting diode (LED).

The automatic lighting system 200 includes a pair of sensors 204 in the form of left and right sensors 204 that are respectively located at the left and right ends of the header 110. However, the automatic lighting system 200 may include only one or more than two sensors 204. The sensor(s) 204 may be located at any desired location on the frame 112 of the header 110. Each sensor 204 may be located on a top surface, an inside surface, or an outside surface at a respective lateral end of the frame 112. Alternatively, the sensor(s) 204 may be positioned near the front of the header 110, where the header 110 engages crop, or at a middle portion of the header 110. It is noted that having two sensors 204 at the left and right ends of the header 110 prevents any interruption of the automatic lighting system 200 when the shadow of the agricultural vehicle 100, in dusk or dawn lighting conditions, undesirably shades one of the sensors 204. Each sensor 204 may be in the form of an ambient light sensor 204 for sensing the ambient light at any desired location within or around the header 110 and providing a corresponding signal. The ambient light sensor 204 may be in the form of any desired photosensor which may sense light and/or electromagnetic radiation. Each ambient light sensor 204 may have a preset threshold of the level of light which is indicative of low-light conditions. As used herein, the term "preset threshold of the level of light" may refer to any level or amount of ambient light at which an operator may desire an improved visibility to see the header 110 and/or surrounding areas thereof. The preset threshold of light may be the known level of light at which low-light conditions exist, for example during dusk, dawn, and/or nighttime. As can be appreciated, each sensor 204 may sense any form of light, such as light which is emitted from the sun and/or any other artificial light source. Additionally or alternatively, the sensor(s) 204 may be located on the agricultural vehicle 100. Each sensor located on the agricultural vehicle 100 may provide feedback which is closely representative to sensor(s) 204 located on the header 110.

According to a further aspect of the exemplary embodiment of the present invention, the sensor(s) 204 may detect the ambient light emitted from the lights of the agricultural vehicle 100, and the controller 210 may correspondingly turn on the light(s) 202 upon the sensor(s) 204 indicating that the lights of the agricultural vehicle 100 have already turned on. Automatically turning on the light(s) 202 of the header 110 when the lights of the agricultural vehicle 100 are turned on may be beneficial if improved visibility is desired even when ambient low-light conditions do not exist or when there is no option to manually turn on the light(s) 202, as with some older model agricultural vehicles.

The controller 210 may be operably connected to the light(s) 202 and sensor(s) 204. The controller 210 may automatically activate or deactivate the light(s) 202 upon the sensor(s) 204 reading that the ambient light is below or above the preset threshold of light, respectively. The controller 210 may be in the form of any desired analog or digital control unit. The memory 212 may be in the form of any desired tangible computer readable medium, and the memory 212 may store any desired information, such as the preset threshold value of ambient light which is indicative of low-light conditions. The controller 210 may interface with and/or be incorporated into existing hardware and/or software of the header 110 and/or agricultural vehicle 100. In other words, the controller 210 may be a separate unit as part of the automatic lighting system 200 and/or be integrated with the header 110 and/or agricultural vehicle 100. For instance, the header 110 may have a dedicated header controller which controls specific header-related functions, and the controller 210 may either be in the form of the dedicated header controller or be incorporated as part of the dedicated header controller.

According to another aspect of the exemplary embodiment of the present invention, the controller 210 may account for the rotational movement of the reel 116. In certain lighting conditions, the reel 116 may periodically block or prevent the sensor(s) 204 from sensing the ambient light. For example, the rotational speed of the reel 116 may be proportionate to one or more frequencies which may interfere with the sensor(s) 204 and thereby cause periodic shadowing of the sensor(s) 204. To mitigate the effect of this periodic shadowing, the controller 210 may calculate an adjusted input for filtering out the interreference caused by the reel 116. For example, the controller 210 may communicate with a speed sensor 206 of the reel 116, use the measured speed of the reel 116 to calculate a corresponding frequency of the reel 116, and then filter out the frequency of the reel 116 from the signal(s) of the sensor(s) 204. It should be appreciated that the reel speed sensor 206 may be operably coupled to the controller 210 by a wired or wireless connection. For instance, the reel speed sensor 206 may communicate to the controller 210 via a connected bus network.

Figure 3:
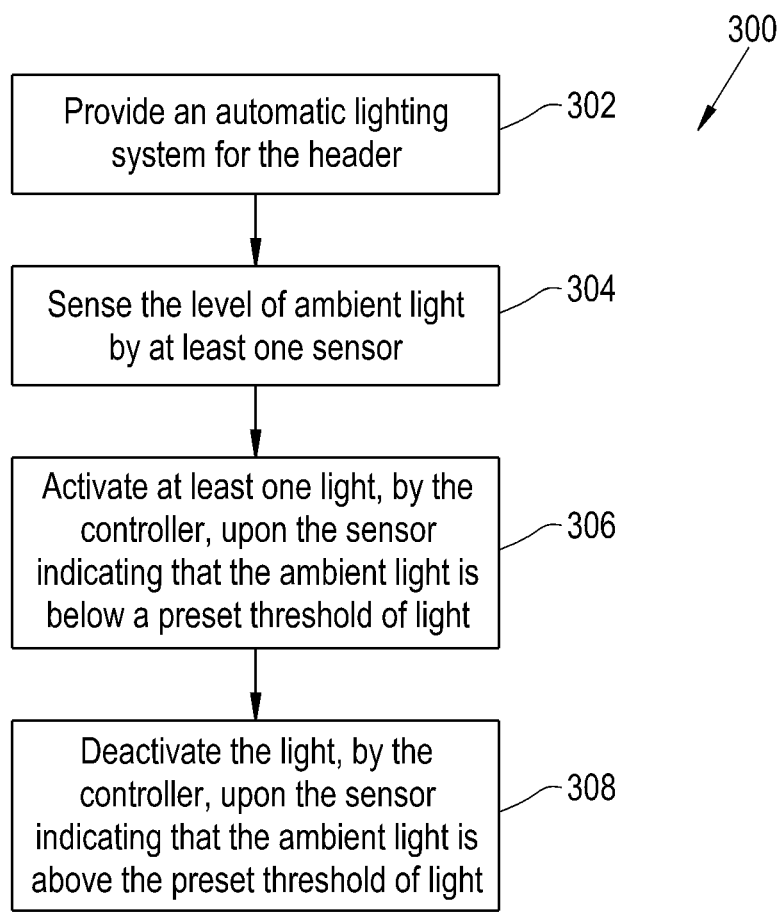
FIG. 3 illustrates a flowchart of a method for operating the lighting system, in accordance with an exemplary embodiment of the present invention.

Referring now to FIG. 3, there is shown a flowchart of a method 300 for operating the agricultural vehicle 100, and more particularly the automatic lighting system 200, in various lighting conditions, such as in low-light conditions. The method 300 may include an initial step of providing the header 110 with the automatic lighting system 200 as described above (at block 302). The method 300 includes a step of sensing the level of ambient light by the sensor(s) 204 (at block 304). The method 300 may also include a step of automatically activating the light(s) 202, by the controller 210, upon the sensor(s) 204 sensing that the level of light is below a preset threshold of light (at block 306). The method 300 may then include a step of automatically deactivating the light(s) 202, by the controller 210, upon the sensor(s) 204 sensing that the level of light is above the preset threshold of light (at block 308). Further, the method 300 may include another step of filtering interference, by the controller 210, upon the reel 116 blocking the sensor(s) 204. Herein, the controller 210 may identify the frequency of the rotating reel 116 and filter out any interference in the signal(s) of the sensor(s) 204 caused by the frequency of the reel 116. It should be appreciated that the automatic lighting system 200 may automatically turn on or off the light(s) 202 depending upon a set time of day. Additionally, if the agricultural vehicle 100 includes a user interface, e.g. a control panel or switch, the operator may input a control command to operate the automatic lighting system 200.

It is to be understood that the steps of the method 300 are performed by the controller 210 upon loading and executing software code or instructions which are tangibly stored on the tangible computer readable medium 212, such as on a magnetic medium, e.g., a computer hard drive, an optical medium, e.g., an optical disc, solid-state memory, e.g., flash memory, or other storage media known in the art. Thus, any of the functionality performed by the controller 210 described herein, such as the method 300, is implemented in software code or instructions which are tangibly stored on a tangible computer readable medium. The controller 210 loads the software code or instructions via a direct interface with the computer readable medium or via a wired and/or wireless network. Upon loading and executing such software code or instructions by the controller 210, the controller 210 may perform any of the functionality of the controller 210 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A header for an agricultural vehicle, comprising:
   a frame comprising lateral ends;
   an automatic lighting system comprising at least four lights coupled to the frame and at least one sensor coupled to the frame and configured for sensing a level of light and providing a signal indicative of the level of light, two of the at least four lights respectively located at the lateral ends of the frame for illuminating an area behind the frame, and two of the at least four lights respectively located inwardly of the lateral ends of the frame for illuminating the frame; and
   an electronic control unit operably connected to the at least four lights and the at least one sensor, and the electronic control unit being configured for automatically operating the at least four lights upon receiving the signal of the at least one sensor.

2. The header of claim 1, wherein the electronic control unit automatically activates the at least four lights upon the at least one sensor sensing that the level of light is below a preset threshold of light.

3. The header of claim 2, wherein the electronic control unit automatically deactivates the at least four lights upon the at least one sensor sensing that the level of light is above the preset threshold of light.

4. The header of claim 1, wherein the at least one sensor is in the form of at least one ambient light sensor.

5. The header of claim 1, further comprising a reel, and wherein the electronic control unit is configured for filtering interference caused by the reel.

6. The header of claim 1, wherein the at least one sensor comprises a pair of sensors, and each sensor is located at a respective lateral end of the frame.

7. An agricultural vehicle, comprising:
   a chassis;
   a feeder housing connected to the chassis;
   a header connected to the feeder housing, comprising:
      a frame comprising lateral ends; and
      an automatic lighting system comprising at least four lights coupled to the frame and at least one sensor coupled to the frame and configured for sensing a level of light and providing a signal indicative of the level of light, two of the at least four lights respectively located at the lateral ends of the frame for illuminating an area behind the frame, and two of the at least four lights respectively located inwardly of the lateral ends of the frame for illuminating the frame; and
   an electronic control unit operably connected to the at least four lights and the at least one sensor, and the electronic control unit being configured for automatically operating the at least four lights upon receiving the signal of the at least one sensor.

8. The agricultural vehicle of claim 7, wherein the electronic control unit automatically activates the at least four lights upon the at least one sensor sensing that the level of light is below a preset threshold of light.

9. The agricultural vehicle of claim 8, wherein the electronic control unit automatically deactivates the at least four lights upon the at least one sensor sensing that the level of light is above the preset threshold of light.

10. The agricultural vehicle of claim 7, wherein the at least one sensor is in the form of at least one ambient light sensor.

11. The agricultural vehicle of claim 7, further comprising a reel, and wherein the electronic control unit is configured for filtering interference caused by the reel.

12. The agricultural vehicle of claim 7, wherein the at least one sensor comprises a pair of sensors, and each sensor is located at a respective lateral end of the frame.

13. A method for operating an agricultural vehicle, comprising:
   sensing a level of light by at least one sensor of a header of the agricultural vehicle comprising a frame having lateral ends, the at least one sensor coupled to the frame;
   providing, by the at least one sensor, a signal indicative of the level of light;
   activating at least four lights of the header automatically, by an electronic control unit of the header, upon the at least one sensor sensing that the level of light is below a preset threshold of light, the at least four lights coupled to the frame, two of the at least four lights respectively located at the lateral ends of the frame for illuminating an area behind the frame, and two of the at least four lights respectively located inwardly of the lateral ends of the frame for illuminating the frame; and
   deactivating the at least one light automatically, by the electronic control unit, upon the at least one sensor sensing that the level of light is above the preset threshold of light.

14. The method of claim 13, wherein the at least one sensor is in the form of at least one ambient light sensor.

15. The method of claim 13, wherein the header further comprises a reel, and wherein the method further comprises a step of filtering interference, by the electronic control unit, upon the reel blocking the at least one sensor.

16. The method of claim 15, wherein the header further comprises a speed sensor for sensing the speed of the reel, and the step of filtering interference includes measuring the speed of the reel by the speed sensor, calculating a frequency of the reel, and filtering out the frequency of the reel from the signal of the at least one sensor.

17. The method of claim 13, wherein the at least one sensor comprises a pair of sensors, and each sensor is located at a respective lateral end of the frame.

* * * * *